United States Patent [19]

Zimmerer et al.

[11] 3,954,120
[45] May 4, 1976

[54] GEAR BOX

[75] Inventors: Arthur L. Zimmerer; Bernard J. Zimmerer; Paul B. Zimmerer, all of Lindsay, Nebr.

[73] Assignee: Lindsay Manufacturing Co., Lindsay, Nebr.

[22] Filed: Dec. 4, 1974

[21] Appl. No.: 529,300

Related U.S. Application Data

[63] Continuation of Ser. No. 136,069, April 21, 1971, abandoned.

[52] U.S. Cl. .............................. 137/344; 74/606 R
[51] Int. Cl.² ...................... B05B 9/02; E01H 3/02
[58] Field of Search ............ 137/344; 239/212, 213; 74/606

[56] References Cited
UNITED STATES PATENTS

| | | | |
|---|---|---|---|
| 2,657,591 | 11/1953 | Kaelin | 74/606 |
| 2,939,344 | 6/1960 | Harris | 74/606 X |
| 3,053,103 | 9/1962 | McAninch et al. | 74/606 X |
| 3,623,662 | 11/1971 | Reinke | 239/213 |
| 3,662,776 | 5/1972 | Bryant et al. | 137/344 |

*Primary Examiner*—Henry T. Klinksiek
*Attorney, Agent, or Firm*—Kinzer, Plyer, Dorn & McEachran

[57] ABSTRACT

A gear box having an extended hub or nose is disclosed herein which is adapted for use on a self-propelled, center pivot irrigation system. The gear box includes a housing, an input shaft extending thereinto, and an output shaft extending outwardly therefrom at a right angle to the input shaft. A gear means in the housing connects the input and output shafts. The housing is mounted on the drive frame of the system with the outer end of the output shaft being connected to a drive wheel which is mounted on the drive frame. The output shaft has a sufficient length so that clearance is provided between the input shaft and the tire on the drive wheel. An extended hub is secured to the housing and extends outwardly therefrom to support the outer end of the output shaft closely adjacent the center of the load imposed on the drive wheel.

Generally speaking, center pivot irrigation systems employ a plurality of wheeled support towers which are secured to and spaced along the length of the water distribution pipe. Ordinarily, each of the towers comprises a drive frame having a pair of spaced apart drive wheels rotatably mounted on the ends thereof. Suitable arms connect the drive frame and the pipe to support the pipe above the ground surface. A power means such as an electrically operated gear motor is usually secured to the drive frame intermediate the ends thereof. A pair of drive shafts extend from opposite sides of the gear motor to gear boxes mounted on the ends of the drive frame. Each of the gear boxes comprises input and output shafts which are disposed at a right angle with respect to each other. The outer end of the output shaft is connected to the drive wheel to supply rotational power thereto so that the distribution pipe is moved about its center pivot. A problem exists with this structure due to the fact that the drive wheels must be spaced outwardly from the drive frame to permit their rotation and the drive wheels must be sufficiently spaced from the drive frame to provide clearance between the tires on the drive wheels and the shafts connecting the gear motor and the input shafts of the gear boxes. If the output shaft of the gear box is lengthened to provide the necessary clearance between the tire and the input shaftl an "overhung" load results which puts tremendous weight and strain on the outer end of the output shaft and such weight and strain usually results in failure of the output shaft.

8 Claims, 5 Drawing Figures

U.S. Patent   May 4, 1976   3,954,120
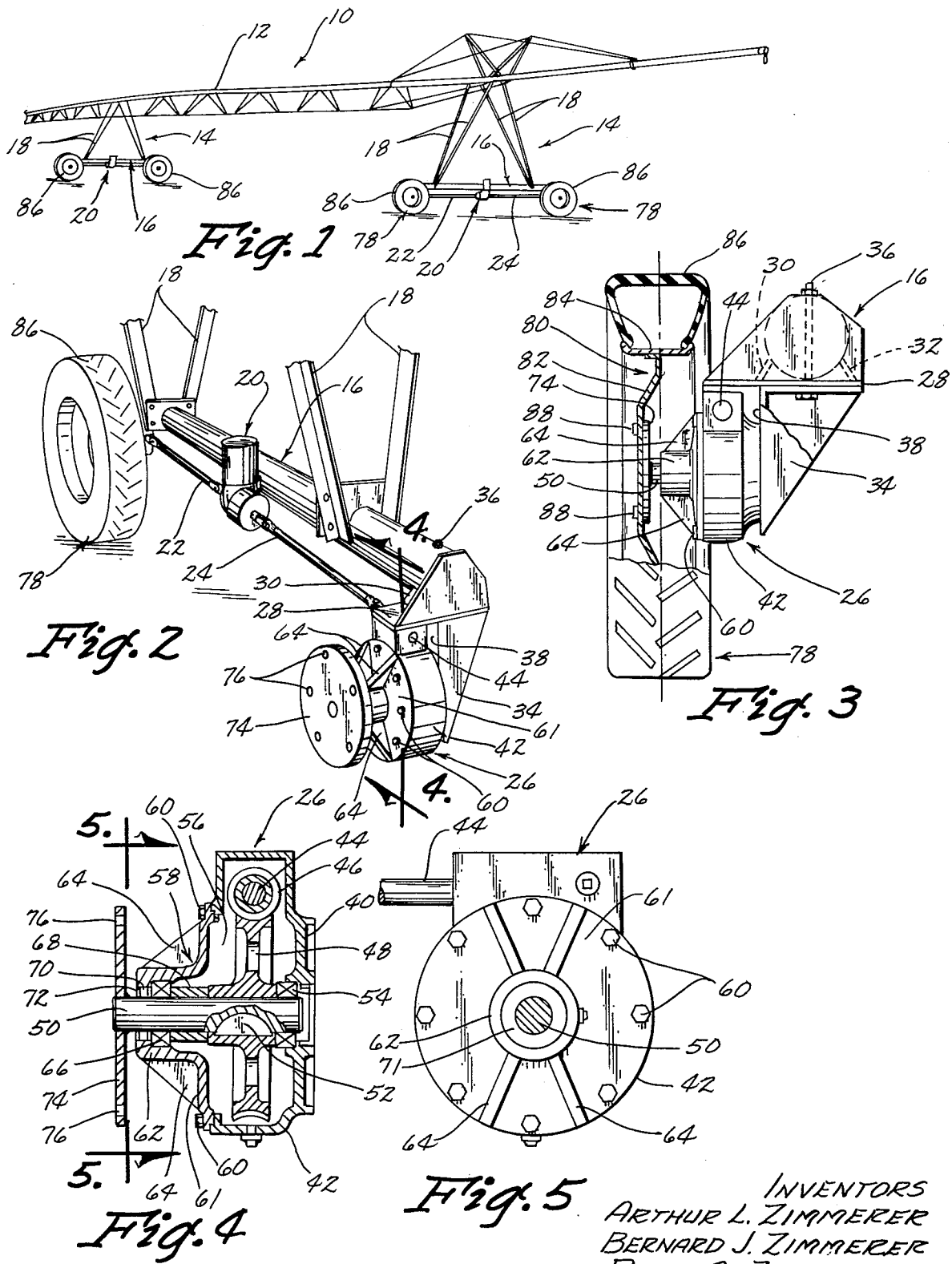

GEAR BOX

This is a continuation of application Ser. No. 136,069, filed Apr. 21, 1971, now abandoned.

Therefore, it is a principal object of this invention to provide a gear box having means thereon for supporting the outer end of the output shaft.

A further object of this invention is to provide a gear box which is especially well adapted for use on a drive frame of a center pivot irrigation system.

A further object of this invention is to provide a gear box having an extended hub or nose which supports the outer end of the output shaft.

A further object of this invention is to provide a gear box having an extended hub thereon for supporting the outer end of the output shaft to provide sufficient clearance between the input shaft thereof and the tire of the drive frame.

A further object of this invention is to provide a gear box having a bearing means which supports the output shaft adjacent the center of the load which is imposed on the drive wheel.

A further object of this invention is to provide a gear box of the type described which is economical of manufacture, durable in use and refined in appearance.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a partial perspective view of a typical center pivot irrigation system:

FIG. 2 is a partial perspective view of a drive frame:

FIG. 3 is a fragmentary end view illustrating the relationship of the gear box, drive wheel and drive frame:

FIG. 4 is an enlarged sectional view seen along lines 4—4 of FIG. 2; and

FIG. 5 is a sectional view seen along lines 5—5 of FIG. 4.

In FIG. 1, the numeral 10 refers generally to a center pivot irrigation system comprising an elongated water distribution pipe 12 which is propelled and supported by a plurality of drive towers 14 spaced along the length thereof. Each of the towers 14 comprise a drive frame 16 which is disposed at a right angle to the longitudinal axis of the pipe 12. A plurality of brace arms 18 connect the drive frame 16 and pipe 12 in conventional fashion. A power means 20 such as an electrically operated gear motor is mounted on the drive frame 16 intermediate the ends thereof and has drive shafts 22 and 24 extending therefrom. The power means 20 is controlled by alignment control means so that the proper amount of rotational power is supplied to the drive shafts 22 and 24 to propel the pipe 12 around its center pivot.

Preferably, a gear box 26 is secured to each end of the drive frame 16. Inasmuch as each of the gear boxes 26 is identical with the exception that one of the gear boxes is a "right" gear box and the other gear box is a "left" gear box, only one of the gear boxes will be described in detail.

A plate 28 is secured to the underside of drive frame 16 as illustrated in FIG. 3 and is reinforced by gusset plates 30 and 32. As seen in FIG. 3, one end of plate 28 extends laterally of the drive frame 16. A mounting box 34 is secured to plate 28 and drive frame 16 by bolt 36 extending therethrough as shown in FIG. 3. Box 34 includes a wall portion 38 which has a plurality of bolt openings (not shown) formed therein. Gear box 26 is secured to wall 38 by means of stud bolts or the like extending through wall 38 and being threadably received by suitable openings formed in the inner end 40 of gear box 26.

Gear box 26 comprises generally a housing 42 having an input shaft 44 rotatably extending thereinto as illustrated in FIGS. 4 and 5. Worm gear 46 is mounted on the inner end of input shaft 44 and is in mesh with a gear 48 as shown in FIG. 4. Gear 48 is mounted on output shaft 50 and is prevented from rotation with respect thereto by means of key 52. The inner end of output shaft 50 is supported by a load carrying bearing means 54.

Housing 42 has its open outer end 56 closed by an extended hub or nose 58 which is secured to the housing 42 by a plurality of cap screws 60.

Hub 58 comprises a base portion 61 and a hub portion 62 which is positioned outwardly therefrom as viewed in FIG. 4. A plurality of reinforcing webs 64 extend between the base portion 61 and the hub portion 62 to reinforce the outer end of the hub portion 62. Output shaft 50 rotatably extends through the hub portion 62 and is supported therein by means of a load carrying bearing 66 which is spaced from the hub of the gear 48 by spacer 68. A seal 70 embraces shaft 50 outwardly of bearing 66 and a cover 72 maintains the seal in position. Flange 74 is secured to the outer end of output shaft 50 by welding or the like and has a plurality of bolt openings 76 extending therethrough.

The numeral 78 refers to drive wheels which are mounted at the opposite ends of the drive frame 16. Each of the drive wheels 78 comprises a wheel member 80 including a central portion 82 and peripheral rim portion 84 upon which is mounted the tire 86. Flange 74 is secured to the central base portion 82 by means of stud bolts 88 extending through the central base portion 82 and being threadably received by the bolt openings 76. It can be seen in FIG. 3 that the outer end of the hub portion 62 is positioned closely adjacent the center line of the tire 86 which is also approximately the center of the load imposed on the drive wheel. This is to say that this center base portion of the wheel is offset outwardly of a vertical center line, as shown in FIG. 3, extending through the tire or the load-bearing portion thereof, with the outward bearing 66 being positioned closely adjacent the vertical center line. The result of this particular relationship is, as shown in FIG. 4, that the vertical load plane of the wheel, shown as a broken line in FIG. 3, passes between the wheel mounting, which is to the left of the vertical line in FIG. 3, and the outermost bearing 66, which is to the right of the load plane. If the extended hub 58 were not provided, the outer end of the output shaft 50 would be unsupported and would result in an "overhung" load which would cause output shaft failure. The extended hub and the bearing means therein insures that the output shaft 50 is supported closely adjacent the center line of the tire and the center line of the load imposed thereon to provide the necessary support to the output shaft 50. The length of the output shaft 50 is sufficient to provide clearance between the shaft 24 and the tire 86. The requirement of such clearance requires that the tire 86 be spaced with respect to the housing 42 to permit the shaft 24 to pass thereby without engaging the tire.

Thus it can be seen that a unique extended hub gear case has been provided which is especially well adapted for use in an irrigation system such as disclosed herein. Sufficient clearance is provided between the input shaft and the tire of the drive wheel while still providing adequate support for the outer end of the output shaft to insure that the system will function without breakdown. Thus it can be seen that the invention accomplishes at least all of its stated objectives.

We claim:

1. A gear box, comprising a housing, an input shaft rotatably extending into the housing, an output shaft generally in perpendicular relation to the direction of the input shaft and rotatably extending outwardly from the housing, said output shaft having inner and outer ends, gears connecting the input and output shaft, a first load-carrying bearing in the housing closely adjacent the gears and supporting the inner end of the output shaft, an extended hub portion secured to one side of the housing extending outwardly therefrom, and a second load-carrying bearing in said extended hub portion supporting the output shaft adjacent the outer end thereof, the distance between the second bearing and the gears being substantially greater than the distance between the first bearing and the gears.

2. The gear box of claim 1 wherein a reinforcing means is secured to said extended hub portion and is operatively secured to said housing for supporting said extended hub portion.

3. A support tower for use in a self-propelled irrigation system which includes an elongated water distribution pipe supported at intervals by movable towers, the tower including a generally upright elongated frame with a ground-engaging wheel on each end and to one side laterally of the frame supporting the system for movement over a field to be irrigated, an electric motor on the frame functioning as a power source to rotate at least one of the wheels, and a gear box mounted on one end of the frame and extending laterally outwardly from one side thereof in a direction toward and joined to the said one wheel, the gear box including a housing with a rotatably mounted input shaft extending generally parallel to the frame and connected to the electric motor with a worm gear thereon in the housing, a rotatably mounted output shaft misaligned with and at right angles to the input shaft with a worm wheel thereon in the housing in engagement with the worm gear, the output shaft extending outwardly of the housing toward and connected to the ground-engaging wheel, load-carrying bearings in the housings on each side of the worm wheel and supporting the output shaft for free rotation in the housing, the first such bearing being on the inner end of the output shaft in a position remote from the ground-engaging wheel and closely adjacent the worm wheel, and the second such bearing being on the outer end of the output shaft in a position adjacent the ground-engaging wheel, the distance between the bearings being substantially greater than the distance between the second bearing and the vertical load plane of the ground-engaging wheel so that the overhung load applied to the bearings caused by the ground-engaging wheel being offset to one side of the frame will be carried by the substantial spacing of the bearings.

4. The structure of claim 3 further characterized in that the distance between the second bearing and the worm wheel is substantially greater than the distance between the first bearing and the worm wheel.

5. The structure of claim 3 further characterized in that the gear box housing is in the form of a generally flat enclosure generally closed on the side with the first bearing and open on the side with the second bearing, and a removable hub closing the open side of the housing supporting the second bearing.

6. The structure of claim 5 further characterized in that the hub is in the form of a generally flat annular inner portion closing the opening in the side of the housing with an extended nose in the center thereof extending axially from the flat annular portion a substantial distance and of substantially smaller diameter with the second bearing in such extended nose beyond the plane of the flat inner annular portion.

7. The structure of claim 3 further characterized in that the distance between the second bearing and the worm wheel is substantially greater than the distance between the first bearing and the worm wheel, and further including a spacer around the output shaft between the second bearing and the worm wheel to maintain said spacing.

8. The structure of claim 3 further characterized by and including a mounting on the outer end of the output shaft for the ground-engaging wheel with the vertical load plane of the wheel passing between the mounting and the second bearing.

* * * * *